United States Patent
Blankenbeckler et al.

(10) Patent No.: US 7,554,898 B2
(45) Date of Patent: *Jun. 30, 2009

(54) DUAL DENSITY DISC WITH ASSOCIATED PROPERTIES

(75) Inventors: David L. Blankenbeckler, Longmont, CO (US); Brian S. Medower, Boulder, CO (US); David H. Davies, Boulder, CO (US)

(73) Assignee: DPHI Acquisitions, Inc., Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 10/085,682

(22) Filed: Feb. 26, 2002

(65) Prior Publication Data

US 2003/0161254 A1    Aug. 28, 2003

(51) Int. Cl.
    *G11B 7/24* (2006.01)
(52) U.S. Cl. .................... 369/275.3; 369/277
(58) Field of Classification Search .............. 369/275.3, 369/275.4, 94, 277, 275.2; G11B 7/24, 7/242, G11B 7/252
    See application file for complete search history.

(56) References Cited

U.S. PATENT DOCUMENTS

| | | | | |
|---|---|---|---|---|
| 4,719,615 A | * | 1/1988 | Feyrer et al. | 369/284 |
| 4,774,170 A | * | 9/1988 | Pan et al. | 430/270.13 |
| 4,825,430 A | * | 4/1989 | Halter et al. | 369/275 |
| 4,960,680 A | * | 10/1990 | Pan et al. | 430/346 |
| 4,975,358 A | * | 12/1990 | Sonnenschein et al. | 430/495 |
| 5,056,079 A | * | 10/1991 | Chung | 369/275.2 X |
| 5,111,345 A | * | 5/1992 | Muller | 360/48 |
| 5,153,873 A | * | 10/1992 | Spruit et al. | 369/275.2 |
| 5,202,862 A | * | 4/1993 | Ohta et al. | 369/13.17 |
| 5,323,380 A | * | 6/1994 | Oda et al. | 369/275.1 |
| 5,344,682 A | * | 9/1994 | Mizukuki et al. | 428/64.9 |
| 5,400,316 A | * | 3/1995 | Igarashi | 369/275.1 |
| 5,464,673 A | * | 11/1995 | Watanabe et al. | 428/65.1 |
| 5,581,539 A | * | 12/1996 | Horie et al. | 369/275.4 |
| 5,591,500 A | * | 1/1997 | Kawanishi | 428/64.1 |
| 5,602,824 A | * | 2/1997 | Ooki et al. | 369/275.4 |
| 5,774,439 A | * | 6/1998 | Aoki et al. | 369/53.29 |
| 5,783,360 A | * | 7/1998 | Phillips et al. | 430/270.12 |
| 5,796,708 A | * | 8/1998 | Ohkawa et al. | 369/283 |
| 5,796,712 A | * | 8/1998 | Moribe et al. | 369/275.4 |
| 5,876,823 A | * | 3/1999 | Nagashima | 428/64.1 |
| 5,923,640 A | * | 7/1999 | Takemura et al. | 369/275.3 |
| 5,936,924 A | * | 8/1999 | Tanaka | 369/47.52 |

(Continued)

FOREIGN PATENT DOCUMENTS

WO    WO 00/79526 A1 * 12/2000

*Primary Examiner*—Joseph H Feild
*Assistant Examiner*—Tawfik Goma
(74) *Attorney, Agent, or Firm*—Jonathan W. Hallman; MacPherson Kwok Chen & Heid LLP

(57) ABSTRACT

An optical storage disc has portions for storing pre-recorded or mastered information and portions for storing user writable information, where the mastered portion and the writable portions have different storage capacities or areal data densities. During manufacture, a substrate is formed with a sequence of bumps to represent the mastered information and a series of grooves and lands, where information can later be written on the lands. A phase-change material is deposited over the substrate, the phase-change material changing both physical structure and optical constants when written to, e.g., by a laser.

7 Claims, 2 Drawing Sheets

U.S. PATENT DOCUMENTS

| | | | |
|---|---|---|---|
| 5,959,946 A * | 9/1999 | Tognazzini | 368/84 |
| 5,991,258 A * | 11/1999 | Morita et al. | 369/275.4 |
| 6,014,363 A * | 1/2000 | Nakamura et al. | 369/275.1 |
| 6,153,063 A | 11/2000 | Yamada et al. | |
| 6,205,112 B1 * | 3/2001 | Weidner | 369/275.3 |
| 6,404,713 B1 * | 6/2002 | Ueki | 369/47.53 |
| 6,503,690 B1 * | 1/2003 | Uno et al. | 430/270.13 |
| 6,594,210 B2 * | 7/2003 | Kumagai | 369/47.17 |
| 6,631,359 B1 * | 10/2003 | Braitberg et al. | 705/50 |
| 6,738,333 B1 * | 5/2004 | Zaharris et al. | 369/59.25 |
| 6,839,900 B2 * | 1/2005 | Obata et al. | 720/729 |
| 6,908,725 B2 * | 6/2005 | Blankenbeckler et al. | 430/270.13 |

* cited by examiner

DUAL DENSITY DISC WITH ASSOCIATED PROPERTIES

FIELD OF THE INVENTION

The present invention relates to optical discs, and more specifically, to recordable optical discs also having pre-recorded content.

BACKGROUND OF THE INVENTION

Data storage discs, and in particular optical data storage discs, are widely used for a number of purposes, such as storage of pre-recorded or mastered information. As used herein, "mastered" information refers to information in which content is incorporated (embossed) onto the disc during the manufacture of the disc. The information may include, for example, music recordings, movies, books, and other media. One common type of optical disc is a Compact Disc (CD), which pre-stores music recordings and allows the music to be played back by the consumer or user. Another common type of optical disc is a Digital Video Disc or Digital Versatile Disc (DVD), which pre-stores and plays back movies. Optical discs that contain mastered information are also sometimes referred to as read-only discs, indicating the ability to read or access the information, but not the ability to write information to the disc.

Other types of optical discs allow the user to write or store information onto the disc. These types of discs are sometimes referred to as write-once or read/write discs, which allow the user to both write information to and read information from the disc. Information can be written, for example, by downloading data via computer networks such as the Internet onto data storage disks. The downloaded data may include the same type of information as pre-recorded data, i.e., movies, music recordings, books, and other media.

In the prior art, information is typically stored on the pre-mastered or read-only optical disc in the form of a sequential pattern of pits on the disc surface, indicating binary information. The detection of these pits is based on the principle of optical contrast detection. For example, the light from the laser is reflected off the pit and the planar region between the pits. The depth of the pits is such that constructive or destructive effects occur, creating an optical contrast between the pits and planar regions. Photodetectors at the optical head sense that optical difference and decode the information as a binary information transition, e.g., from 1 to 0 or from 0 to 1.

In read/write discs, the information is stored in the form of marks, usually in the grooves of the disc. Such marks can typically be a change in the nature of the material, such as the alteration of the structure of the material. Storing information or writing data onto the disc requires energy, typically in the form of laser light, to form the physical marks in the material. Typically, the marks are written into the groove. In the case of what are called front or first surface discs, the information surface is the first surface that the read or write laser impinges. To the contrary, in second surface discs, the information surface is the second surface that the read or write laser impinges, the first surface being the surface of the substrate. The stored information is read by detecting the absence or presence of the marks in the grooves of the coating layer, such as by an optical head or reader. This then allows the stored information to be played back. The detection principle for recorded information in such discs is often the change in the optical reflectivity of the coating layer. Another principle in such discs is the change in the polarization axis of the light.

Reading or playing back the information in second surface discs is typically achieved by the optical reader transmitting a light beam through the substrate of the disc and onto the information layer, or the groove and pits, and reflecting the light beam back through the substrate. The substrate is typically a clear plastic material on which the information layer is formed. Because the light is incident on two surfaces, the substrate surface and the information surface, this type of disc can be referred to as second-surface or substrate-incident discs or media.

The relatively thick and transparent substrate of second-surface optical media makes read-only or read/write operations relatively insensitive to dust particles, scratches and the like since they can be located approximately a thousand wavelengths or more from the information layer and hence are defocused. On the other hand, the second-surface optical medium can be relatively sensitive to various opto-mechanical variations. For example, common opto-mechanical variations include tilt of the substrate relative to the optical axis, substrate thickness variations, and/or substrate birefringence.

These variations give rise to optical aberrations which degrade system performance arising from the presence of the thick transparent layer and which can, at least theoretically, be partially compensated for by using a suitable optical path design. Such an optical path typically can only provide compensation for a single, pre-defined thickness of the layer. Because there are likely to be variations in the thickness or other properties of the transparent layer, such compensation may be less than desired at some locations of the medium.

Another drawback associated with second-surface optical media is that the optical requirements of such media are substantially inconsistent with the miniaturization of the disc drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the recording layer. To provide the longer working distance, larger optical components (e.g., objective lenses) are required.

Accordingly, an optical disc is desired that overcomes the disadvantages discussed above with conventional optical discs.

SUMMARY OF THE INVENTION

In accordance one aspect of the invention, a first surface optical disc uses raised bumps, instead of recessed pits, formed on the recording reference surface of the disc to provide a play-back (i.e., read-only) function. The recording reference surface is the surface that is the first surface that the laser impinges on as it approaches the disc when reading information. The first surface of the disc also contains a land and groove (or "grating") structure on which information can be directly written to or stored. This land/groove portion of the disc can be on the same contiguous side of the disc having the raised bumps.

The layer on which information is written to or stored and subsequently read from is formed from a phase-change material overlying the lands, in which both the physical properties and the optical constants of the material change when written to, such as by a laser. The properties of the material are such that the changes are constructive with the effects from the grating structure when writing to the lands. In other words, changes to the material when written to increase the reflectivity of the written-to portions in conjunction with the effects of the grating structure, resulting in a higher amplitude reflected signal.

In one embodiment, the material is in an amorphous state prior to writing. The laser changes specific portions of the amorphous material to a crystalline state having a higher reflectivity than the amorphous portions, with the crystalline portions representing stored bit information as the written mark.

The optical constants of the material (e.g., an InSnSb alloy), combined with an overlying dielectric layer, are such that the crystalline or written-to marks have a higher reflectivity than the amorphous or unwritten-to portions. The optical constants of the material also introduce a positive optical phase shift when written to, which reduces the effective depth of the groove when writing on lands. According to one embodiment of the invention, the range of groove depths is between 80 nm and 90 nm. Within this range, the effective reduction in groove depth contributes to an increased reflectivity of the crystalline mark, which advantageously increases the signal amplitude of the reflected signal.

The combination of land recording with bump topology enables one embodiment of first surface recording, in that a laser writes to the lands instead of the grooves, resulting in higher carrier-to-noise ratios (CNRs). This is due in part to higher reflectivity of written portions on the lands, as compared to on the grooves.

Optical systems using first surface optical discs are also smaller than ones using conventional second surface discs. In one embodiment, the optical disc has an outer diameter of about 50 mm or less (and more typically about 35 mm or less (e.g., 32 mm±0.05 mm) and a thickness of about 0.6 mm (e.g., 0.6 mm±0.03 mm). The disc dimensions are limited by the molding process needed for forming the bump/land topology of the disc of the present invention.

First-surface optical discs refers to discs in which the first surface the read or write beam impinges on during a read or write operation is the information-carrying surface of the disc, as opposed to the substrate surface, as with substrate-incident or second surface discs. The "information-carrying portions" can be defined as portions of the optical disc that store or contain servo data, address data, clock data, user data, system data, as well as any other information that is provided on the optical disc. The "information content portions" can be integral with the substrate such as the case of a read-only disc. The information content portions can also be separately provided. In such a case, the information content portions can be, for example, an information layer of a writable disc.

The first-surface disc offers numerous advantages over a second-surface disc. By way of example, with a first-surface disc, the radiation or laser light does not pass through the relatively thick substrate so that there is a relatively shorter optical path in comparison with a second-surface disc, thereby providing a significantly shorter working distance in comparison with a second-surface disc. Since there is a shorter working distance, a smaller objective lens diameter, for a given numerical aperture, can be utilized which results in smaller, lower mass optical components to achieve a greater degree of optical drive miniaturization. Furthermore, the first-surface disc is not sensitive to substrate birefringence and substrate thickness variations. The first-surface disc is also much less sensitive to substrate tilt.

First surface discs, according to the invention, also include portions that have mastered information. The mastered information is stored in the form of bumps during manufacture of the disc. To form these bumps, the molding process uses mother stampers, instead of the traditional father stampers, which are used to form pits in the disc. Mother stampers are formed from father stampers to create an "inverse" of the father stampers. Thus, mother stampers have recesses or pits instead of bumps. However, when molding the disc, it is more difficult for resin to flow into pits than over bumps. Therefore, the density of the mastered or pre-recorded portions of the disc is reduced to allow the resin to flow more easily into larger pits.

First surface discs, according to the invention, have the ability to both store mastered information and to allow the user to write information to the disc. The portion of the disc that is user-writable contains grooves and lands, where information is written onto the lands. Because there are no bumps to be formed in these portions, the data density can be higher than in the mastered portions. Accordingly, one feature of the present invention is an optical disc having two different densities, a lower density in the pre-recorded or ROM portions and a higher density in the writable portions. In one embodiment of a 32 mm two-sided disc, the ROM portion or side has a 200 Megabyte capacity if fully utilized for pre-recorded information, and the writable portion or side has a 250 Megabyte capacity if fully utilized for writable content. In this embodiment, this corresponds to an areal data density of 3.8 Mbits/sqmm in the pre-recorded portion and 4.7 Mbits/sqmm in the writable portion. By having dual density, the process yield is maximized and the associated data jitter is minimized, along with a reduction in cost.

The present invention will be more fully understood when taken in light of the following detailed description taken together with the accompanying drawings.

BRIEF DESCRIPTION OF THE DRAWINGS

Use of the same or similar reference numbers in different figures indicates same or like elements.

DESCRIPTION OF THE PREFERRED EMBODIMENTS

In accordance with one aspect of the present invention, a first surface optical disc includes both ROM or pre-recorded portions and recordable or writable portions for storing data. The density or storage capacity of the ROM portions is lower than the density of the recordable portions. Data is written (e.g., with a laser) to the-recordable portions, and more specifically on a phase-change material overlying lands, instead of grooves. The laser changes the state of the material from an amorphous state to a crystalline state having a higher reflectivity than the amorphous state. The change to a crystalline state alters the physical structure and optical constants of the material.

Figure 1A:
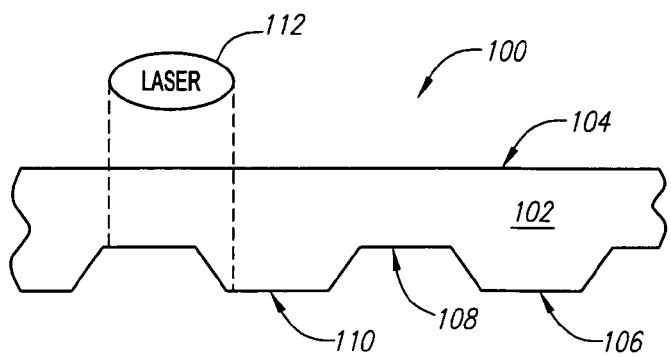
FIG. 1A is a cross-sectional side view of a second surface disc.
Figure 1B:
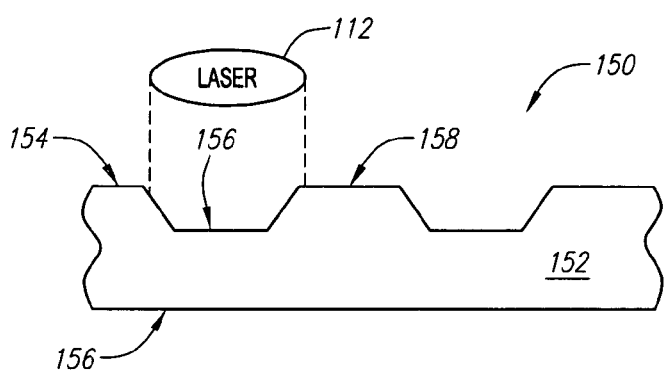
FIG. 1B is a cross-sectional side view of a first surface disc.

FIGS. 1A and 1B illustrate a difference between first surface discs and second surface or substrate-incident discs. FIG. 1A is a cross-sectional side view of a second surface disc 100. Disc 100 includes a substrate 102 (e.g., made of a polycarbonate material) having a substrate surface 104 and an information or data layer 106. Information layer 106 has, relative to its surface, recesses called grooves 108 and raised portions called lands 110. Light from a laser 112 impinges first on substrate surface 104, travels through substrate 102 and reflects off information layer 106, such that the laser light impinges on two surfaces for reading and writing. In a typical second surface disc, information is written to and read from grooves 108.

FIG. 1B is a cross-sectional side view of a first surface disc 150 having a substrate 152, an information layer 154, and a substrate surface 156. In a first surface disc, light from laser 112 impinges on and reflects off information layer 154, i.e., light only impinges on one surface for reading and writing. In conventional first surface discs, information can be written to and read from recesses relative to the surface of information layer 154 called grooves 156. The protrusions closer to the laser light are lands 158. It should be noted that first surface discs of the present invention utilize lands, instead of grooves, for the writing and storing of information.

Thus, as seen from FIG. 1A, lands 110 are actually farther from laser 112 than grooves 108 in a second surface disc, which is opposite that of a first surface disc, as seen from FIG. 1B. For either a first or second surface disc, the groove is recessed into the substrate. Note that grooves 108 are the features typically created by a mastering laser during disc manufacture. So, a main distinction between first and second surface discs is the direction in which laser 112 (e.g., a read/write head) impinges on the disc. For a second surface disc (FIG. 1A), the direction is from the substrate surface to the information layer, while for a first surface disc (FIG. 1B), the direction is from the information layer to the substrate surface.

Conventional second surface or substrate-incident discs require substrates that are relatively stress-free with no birefringence. Stress, birefringence, and any imperfections can affect reading of the disc since the read beam must travel through the substrate. This limits the molding process window. However, this constraint is not present in first surface discs.

Figure 2:
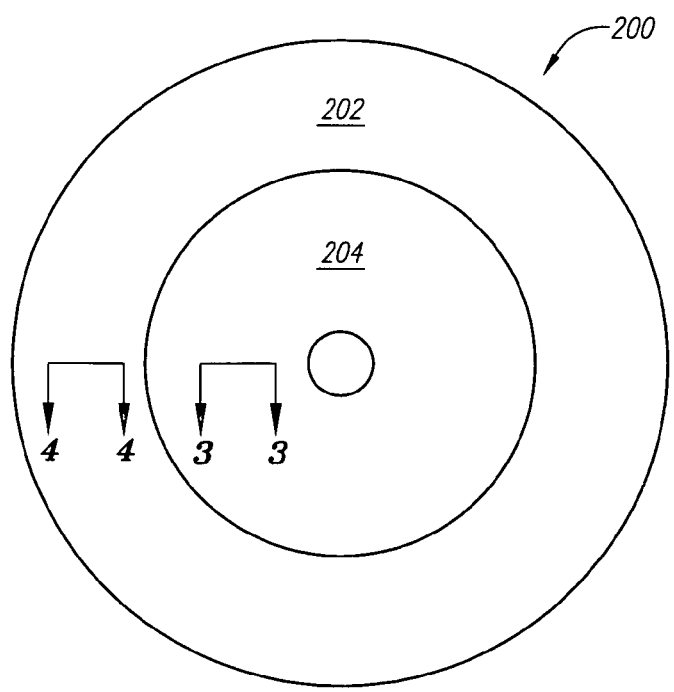
FIG. 2 is a top view of a first surface optical disc 200 according to one embodiment of the present invention.

FIG. 2 is a top view of a first surface optical disc 200 according to one embodiment of the present invention. Disc 200 has a ROM or pre-recorded portion 202 that contains pre-recorded or mastered information, such as a music recording. Disc 200 also has a writable portion 204 that can be written to by the user. ROM portion 202 has a lower data density or storage capacity than writable portion 204, as will be discussed in detail below. Although ROM portion 202 and writable portion 204 are shown on the same side of disc 200, it will be appreciated that a side of disc 200 can contain only ROM portion 202 or writable portion 204. Alternatively, ROM portion 202 and writable portion 204 can exist in multiple areas on the same side of the disc. ROM portion 202 contains a sequence of bumps that are read to reproduce the stored information. The bumps are formed during the manufacture of the disc. Writable portion 204 contains spiral grooves and lands, where the lands are the portions of the disc closest to the optical reader or head. The lands are written to and read for storing and reproducing the information, respectively.

Figure 3:
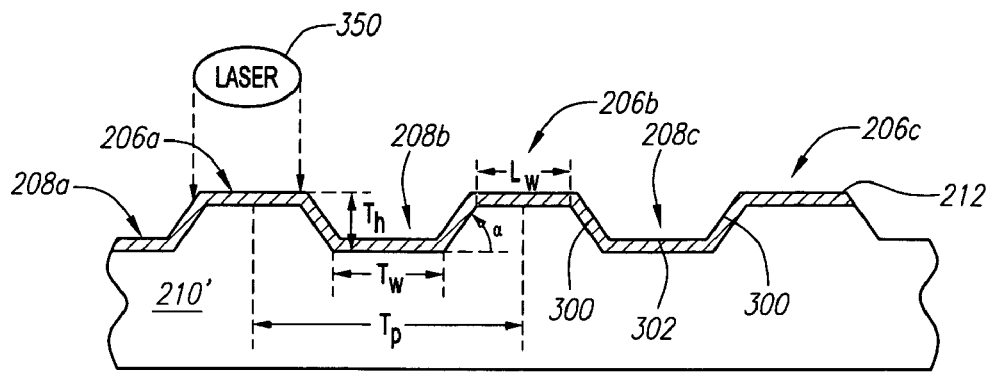
FIG. 3 is a side view of optical disc 200 along a sectional line 3-3 of FIG. 2 containing writable portion 204.

FIG. 3 is a side view of optical disc 200 along a sectional line 3-3 of FIG. 2 containing writable portion 204. Writable portion 204 includes lands 206 and grooves 208 formed on a substrate 210, such as a polycarbonate substrate. The data surface of substrate 210 contains the lands and grooves. Because this is a first-surface disc, light from a laser 350 used to read and write data impinges first on the data surface of substrate 210. A layer of phase-change material 212 is formed over the substrate 210. Phase-change material 212 has properties such that the material is in a first state after formation on the substrate, but changes to a second state after it is written to, such as by a laser. In one embodiment, the material is in an amorphous state as deposited. However, once the laser impinges on the material at sufficient power to write, that portion is changed to a crystalline state having a higher reflectivity and a different physical structure than the amorphous portions. Optical indices of refraction are also changed, such that the light passing into the layer is phase shifted. Note that "phase-change" material refers to materials that change physical structure, and in some cases also have an inherent optical phase shift.

In one embodiment, an alloy of Sb, In, and Sn is used as the phase-change material, and the reflectivity of the amorphous portion is 18.2%+3%, while the reflectivity of the crystalline portion increases to 29.5%+3%. One additional property is that the optical phase shift (due to changes from both optical constants and physical structure) is constructive with the grating effects of the land/groove structure. When writing on the lands, as compared with writing on the grooves, the optical phase shift results in an effectively shallower groove. This yields a higher reflectivity of written portions on lands and a higher contrast between the written-to and unwritten portions. Consequently, the optical system receives higher reflected signal amplitudes, thereby improving system performance. Additional details of the effects of the grating structure and phase-change material are disclosed in commonly-owned U.S. patent application Ser. No. 10/056,927, entitled "Use of Mother Stamper for Optical Disc Molding", filed Jan. 24, 2002, which is incorporated by reference in its entirety. Note that the writable portion is "write-once" because, once written, the crystalline portions cannot be returned to the amorphous state.

When writing to the phase-change material, there is also a physical change that is constructive with the change in optical constants within the range of groove depths of the invention. In some embodiments, the range is between 4 nm and 12 nm or about 10% of the film thickness. The physical change is an actual depression in the written-to or crystalline portions relative to the surface of the amorphous portions. This change also increases the reflectivity of the crystalline marks on the lands.

For example, when the written-to portion changes to a crystalline state, the thickness of the material decreases. The corresponding change in optical constants is such that the effective thickness also decreases, thereby contributing to, instead of compensating for, the physical change in state. In other words, when a change in thickness results in a retardation of the optical phase relative to the phase of the incoming light, then the change in the optical constants (e.g., indices of refraction) of the layer must also act to induce phase retardation. An example of a suitable material is an SbInSn alloy (e.g., $Sb_{70}In_{15}Sn_{15}$) disclosed in U.S. Pat. No. 4,960,680 to Pan et al. and U.S. Pat. No. 5,271,978 to Vazan et al., both of which are incorporated by reference in their entirety.

In one embodiment, if laser light at a wavelength $\lambda=650$ nm is used to write data to the SbInSn alloy of thickness 85 nm, the total phase shift on reflection is approximately 20°, resulting in a total equivalent effective decrease in thickness to approximately 68 nm. The physical depression of the written-to mark is approximately 8 nm, i.e., the laser light travels a longer distance before reaching the written-to mark than the amorphous portions. This results in a total phase shift on reflection of approximately 9°. Writing to the phase-change material on lands also causes an optical constant change, corresponding to approximately 11°. This change is in the same direction as the phase shift due to the change in physical structure, resulting in a total phase shift of approximately 20°. Note that other wavelengths can be used, which will result in different phase shifts.

It is also noted that materials in which the written-to portion results in both effects contributing to phase advancement, instead of retardation, are also suitable. The principle of constructive effects of physical thickness change and the equivalent effect resulting from changes in optical indices of refraction are known to those skilled in the art, such as described in Chapter 2 entitled "Read Out of Optical Discs" by J. Braat, in "Principles of Optical Disc Systems" by Bouwhuis et. al, Adam Hilger, Boston 1985, which is incorporated by reference in its entirety.

If the grooves are written to, the effective depth of the groove increases at the written-to portions. The corresponding phase effect reduces the reflectivity, which reduces the contrast between the amorphous and crystalline portions. This results in a lower reflected signal amplitude and adversely affects the ability to accurately read the data or information written.

Thus, according to the invention, data is read from bumps and written on lands of optical disc 200. This data layer is phase-change material 212 formed over the bumps and lands. After substrate 210 is molded with bumps, grooves, and lands, phase-change material 212 is deposited over substrate 210, such as by physical vapor deposition (e.g., evaporation or DC or RF sputtering). An argon and oxygen gas is used as the sputtering gas. Such a concentration results in a temperature of approximately between 165° C. and 175° C. to transition from amorphous to crystalline state. Other properties of the phase-change layer are reflection coefficients of 4.2±3% and 2.55±3% in the amorphous and crystalline states, respectfully, and dielectric constants 3.0±3% and 4.7±3% in the amorphous and crystalline states, respectfully. The layer of phase-change material 212 has a thickness ranging from about 80 nm to about 90 nm, with a typical thickness of 85 nm±3%.

A protective layer (not shown), such as silicon oxide, silicon nitride, or silicon oxynitride (with a process-adjustable index of refraction between 1.6 and 2.0 at 650 nm), can then be deposited over the data layer, such as by DC or RF sputtering. Commonly-owned U.S. patent application Ser. No. 09/854,333, entitled "Optical Data Storage with Enhanced Contrast", filed May 11, 2001, which is incorporated by reference in its entirety, discloses forming a SbInSn layer and a protective layer on the disc. The protective layer has a thickness ranging from about 54 to about 58 nm, with a typical thickness of 56 nm±3%. The lands have a typical height of 85 nm, with a range of 80 nm to 90 nm, and a typical width of 540 nm, with a range of 520 nm to 560 nm. These values are measured at full-width half-height, and include the molded feature, the phase-change material, and the protective layer.

Referring back to FIG. 3, according to the present invention, data is written on lands 206 instead of in grooves 208. For example, using 650 nm laser light and a lens such that the optical spot is about 0.6 micron in diameter at full-width half-max, which corresponds to a lens numerical aperture (NA) of about 0.6, it is possible to write to the disc with energy incident to the surface of about 2 mW. This is with a constant linear velocity of about 3 m/s.

According to one embodiment, the above described structure is a first surface disc in which the lands are written to and read from. The first surface disc, as discussed above, is a disc in which the read or write laser impinges on and reflects off the first surface (e.g., the layer of phase-change material 212) instead of first travelling through a substrate before hitting the information or data layer. In turn, the feature of different densities in the ROM and writable portions optimizes the molding process window so that small features (e.g., bumps) resulting from the use of first surface technology are practical. In addition this enhanced process window facilitates the molding of thinner discs, for example a disc of the present invention has a thickness of about 0.6 mm±0.03 mm.

It should be noted that although the description refers to a single data layer on a side of the optical disc, two data layers on a side are also suitable, such as disclosed in commonly-owned U.S. patent application Ser. No. 09/764,042, entitled "First-Side Dual-Layer Optical Data Storage Disk and Method of Manufacturing the Same", filed Jan. 16, 2001, now abandoned and incorporated by reference in its entirety. Commonly-owned U.S. patent application Ser. No. 09/560,781, entitled "Miniature Optical Disk for Data Storage", filed Apr. 28, 2000 and now abandoned, incorporated by reference in its entirety, also discloses a method of manufacturing a first-surface disc.

Discs according to the present invention can be formed using mother stampers, such as disclosed in the earlier referenced U.S. patent application Ser. No. 10/056,927. Using the mother stamper, optical discs are produced by placing the stamper in a mold cavity of an injection molding press and injecting molten plastic into the mold. The resulting molded discs have an imprint of the stamper. The molded discs are then coated with a phase-change material or a variety of other thin films (e.g., reflective layers, active layers, overcoats) depending on their type. The molded discs can be coated by a variety of methods, such as sputtering, spin coating, and chemical vapor deposition (CVD). Manufacturers of optical discs include Ritek of Taiwan, Sony of Japan, Matsushita of Japan, and Imation of Oakdale, Minn.

In using a mother stamper, data is embossed in the form of bumps, and high frequency wobble marks and micro fluctuations from the original laser cut are replicated along the grooves of the disc. The wobble marks and micro fluctuations are used to control the rotational speed of the disc, generate a clock signal, and indicate the addresses in the writable portions. In one embodiment, writable portion 204 is a "write once read many" (WORM) data zone, meaning that data written in portion 204 cannot be erased or moved but can be read many times. After optical disc 200 is manufactured, and before any data is written to it, writable portion 204 contains a continuous spiral of homogenous grooves and lands.

To summarize, disc 200 contains two basic areas, ROM portion 202 and writable portion 204. The ROM portions contain a spiral track of bumps that are embossed onto the disc during manufacture, the bumps being separated by spaces; immediately following manufacture, the writable portion contains only spiral grooves and lands, which is also embossed onto the disc. The ROM portions do not need to contain a groove because the track of embossed bumps can be used by the optical head for tracking purposes. In the writable portions, the spiral lands and grooves provide a tracking signal during the reading or writing of information. In the embodiment described, the digital information in the writable portion consists of crystalline "bits" in the otherwise amorphous active layer. The crystalline bits are also referred to as "bright marks" since they are of a higher reflectivity than the surrounding amorphous portions. The bright marks, which are analogous to the bumps in the ROM portions, are formed on the lands.

Figure 4:
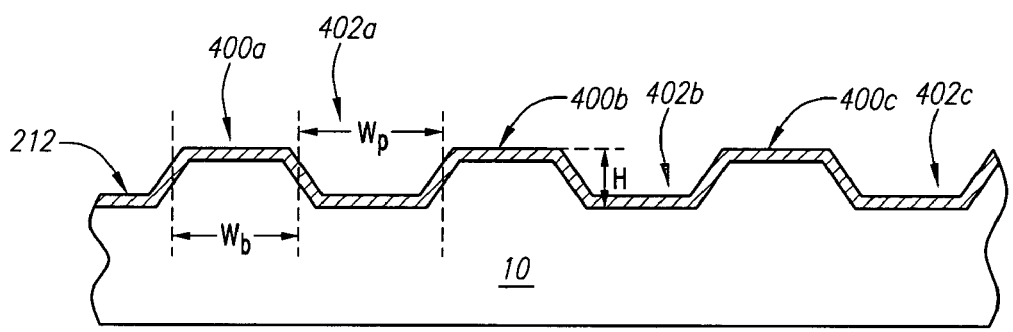
FIG. 4 is a side view of optical disc 200 along a sectional line 4-4 of FIG. 2 containing read-only (ROM) portion 202.

FIG. 4 is a side view of optical disc 200 along a sectional line 4-4 of FIG. 2 containing ROM portion 202. The ROM or pre-recorded information is represented as a series of bumps 400 and planar regions 402 between radially adjacent bumps

400. FIG. 4 shows three adjacent bumps 400*a*, 400*b*, and 400*c*, and three radially adjacent planar regions 402*a*, 402*b*, and 402*c*. The series of bumps 400 and planar regions 402 are typically configured in a spiral pattern on the disc surface. Uncoated width $W_b$ of bumps 400 ranges from 200 to 250 nm, with a typical width of 225 nm±5 nm, measured at full width half max. In one embodiment, when a bump is present in an adjacent track, uncoated widths $W_P$ of planar regions 402 range from 485 to 545 nm, with a typical width of 515 nm, measured at full width half max. The height H of each uncoated bump 300 ranges from about 80 nm to about 90 nm, with a typical height of 85 nm. After coating (with phase-change material and protective coating), the ranges for the width of the bumps are between approximately 340 and 360 nm. Note that the molded disc in ROM portion 202 is also coated with phase-change material 212, which in this portion, only acts as a reflector and is not written to. This is because the read power in ROM portion 202 is below the threshold power needed to change structure of the phase-change material. Read powers with a 650 nm laser light, 3 m/s constant linear velocity, and 0.6 NA optics are typically between 200 and 300 μW, as compared to 2 mW for the write power, as discussed above.

Figure 5:
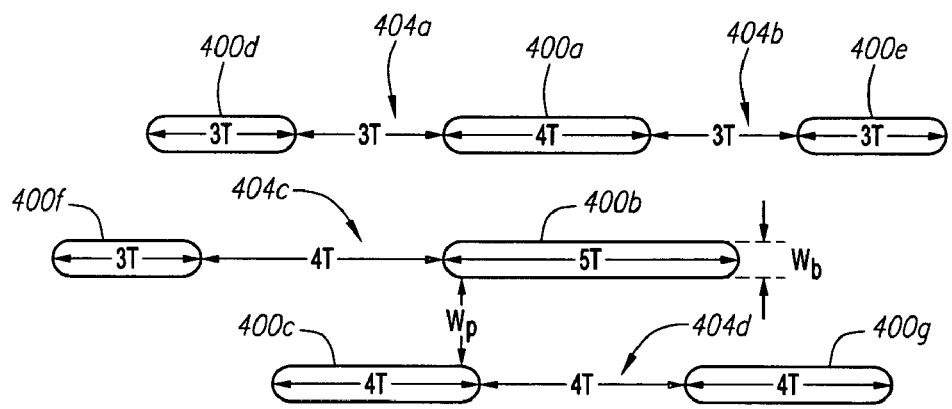
FIG. 5 is a top view of optical disc 200 along an area of ROM portion 202.

FIG. 5 is a top view of optical disc 200 along an area of ROM portion 202. A sequence of bumps 400*a-g* and planar regions 404*a-d* are shown, where an optical reader scans or reads the bumps and planar regions along the longitudinal direction. The lengths of bumps 400 have various coated and uncoated lengths, which are shown in Table 1 below, and are further detailed in U.S. patent application Ser. No. 09/666,627 incorporated by reference in its entirety. Planar regions 404 are often the same length as bumps 400, but the bump-to-planar-region length ratio can be adjusted to optimize the readback signals. The mark, T, represents a minimum timing mark, with mark lengths corresponding to pulse intervals ranging from 3T to 14T.

TABLE 1

| Mark (T) | Typical bump length after coating (nm) | Molded bump length (uncoated) (nm) |
| --- | --- | --- |
| 3 | 537 | 387 |
| 4 | 716 | 566 |
| 5 | 895 | 745 |
| 6 | 1074 | 924 |
| 7 | 1253 | 1103 |
| 8 | 1432 | 1282 |
| 9 | 1611 | 1461 |
| 10 | 1790 | 1640 |
| 11 | 1969 | 1819 |
| 14 | 2506 | 2356 |

Usually, each bump and each planar region represents a number of binary bits. Bumps 400 and planar regions 404 can be formed when the optical disc is formed using a mother stamper, as disclosed in U.S. patent application M-11628 US, referenced above. Because the mother stamper has cavities into which resin flows for forming the data bumps, the small size of the bumps limits the density or storage capacity of the ROM portion to approximately 3.8 Mbits/sqmm. Higher densities could prevent resin from flowing completely into the cavities, resulting in errors in the pre-recorded information. The flowing resin has to fully penetrate into the pits of the mother stamper in order to form bumps that have consistent height, length, width with uniform consistency. The read-only error rate performance of the discs is dependent on the consistency of the smallest bump. The smaller the bump, the more difficulty is encountered in achieving suitable error rates. Tables 2 and 3 below show data to data jitter values for different feature sizes in the ROM and writable portions, respectively, of disc 200.

Jitter is defined as either the standard deviation of a signal's transitions from its ideal positions in time or the standard deviation of the timing variations from transition to transition. Jitter, as defined herein, is an important metric that measures the integrity of the molded or written data and is a major determinant of system performance. In particular, jitter can be directly correlated to error rates. The data transition to data transition jitter given is the standard deviation as a percentage of the specific timing window.

TABLE 2

| Uncoated bump size (l × w) | Data density | Jitter (% data to data) | User capacity for 32 mm disc |
| --- | --- | --- | --- |
| 310 × 225 nm | 4.7 Mbits/sqmm | 23.6% | 250 Mbytes |
| 390 × 225 nm | 3.8 Mbits/sqmm | 10% | 200 Mbytes |

TABLE 3

| Uncoated land width | Data density | Jitter (% data to data) | User capacity for 32 mm disc |
| --- | --- | --- | --- |
| 400 nm | 4.7 Mbits/sqmm | 13% | 250 Mbytes |

A suitable data-to-data jitter value in one embodiment is 14% or lower. As seen from Table 2, at this jitter value, it is necessary that the length of a molded bit (uncoated) be greater than the 310 nm required to reach 4.7 Mbits/sqmm areal density. A molded bump length of about 390 nm provides significantly lower jitter, by reducing the areal density to 3.8 Mbits/sqmm. Higher densities (corresponding to smaller bit lengths) result in greatly higher jitter values, while lower densities (corresponding to longer bit lengths) result in lower jitter, but useful capacity drops. Note that densities can be adjusted depending on requirements for jitter or other parameters. A similar trade-off exists for land widths. Table 3 shows that for a suitable jitter of 14% or lower, the width of the land should be about 400 nm, which corresponds to a density of 4.7 Mbits/sqmm. Higher densities result in higher error rates, while lower densities result in lower useful capacity. It should be noted that in a typical disc where a certain portion of one disc side is read-only and the other portion of the same side is writable, the density will be different on the two portions. Thus, in the above example, for a 32 mm disc, the equivalent total user capacity of the disc side will be between 200 and 250 Megabytes.

The density limitation of the ROM portions, however, is not present in the writable portion 204. As noted above, writable portion 204 does not have pits or bumps during manufacture, only grooves and lands. Referring back to FIG. 3, writable portion 204 includes a plurality of alternating lands 206*a-c* and grooves 208*a-c*, which are shown as having the same width, although their widths could be different. Grooves 208*a-c* are in the form of a trough, with inclined left and right sidewalls 300 and flat bottoms 302 and can be arranged in a spiral pattern or another desired pattern. The left and right sidewalls 300 are typically inclined at an angle α (alpha) ranging from about 30° to about 50° (measured relative to the bottom of groove 108), e.g., 45°.

The height $T_H$ of sidewalls 300 (i.e., distance from the top of the land to the bottom of the groove) ranges from about 80 nm to about 90 nm, with a typical height of 85 nm, without any of the coating. The pitch or distance $T_P$ of the adjacent center lines of lands 206a and 206b typically is about 0.74 µm and can be in the range from about 0.70 to about 0.78 µm. The width $L_W$ of lands 206 and the width $T_W$ of the bottoms of grooves 208 are typically approximately the same, and the inclined left and right sidewalls 300 are approximately the same length. For an uncoated disc, $L_W$ is 400 nm±20 nm in one embodiment. As will be appreciated, however, $L_W$ (width of lands 206) and $T_W$ (width of the bottoms of grooves 208) can be different depending on the application. However, because the stamper contains continuous spiral grooves and lands in writable portion 204, instead of the discrete pits found in the ROM region 202, it is easier to mold. The plastic used in the injection molding process flows more readily into the continuous grooves than into the discrete pits. This makes the ROM data the limiting factor when it comes to areal data density. Reducing the ROM density while maintaining a higher writable density allows process yields to be maximized, and jitter values to be minimized, while still maintaining the highest practical total user data capacity when manufacturing optical discs according to the present invention.

While the above describes and shows only one side of disc 200, it will be understood that an identical process (e.g., injection molding using mother stampers) can be performed simultaneously on the other side of the disc to create a double-sided optical disc, thereby avoiding the need for multiple sequential molding processes. In one embodiment of a double-sided optical disc, the ROM portion is on a first side, while the writable portion is on the second side. In such a disc, with a diameter of 32 mm, the ROM portion has a density of 200 Megabytes if fully utilized, and the writable portion has a density of 250 Megabytes if fully utilized.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A first surface optical storage disc, comprising:
a circular substrate having a first principal surface and an opposing second principal surface;
a spiral track of bumps formed on a first portion of the first principal surface, wherein the bumps represent pre-recorded information, the bumps being separated by planar regions;
lands formed on a second portion of the first principal surface, the lands being separated by grooves; and
a phase-change material deposited on the first portion and the second portion of the first principal surface; and
a dielectric layer sputtered over the phase-change material; the first surface disk having no additional layers overlaying the dielectric layer, the first portion thereby being a ROM portion and the second portion being a RAM portion, wherein a combined thickness of the phase change material and the dielectric layer is such that the dielectric layer defines coated bumps having a first height with regard to coated planar regions in the first portion, and coated lands having a second height with regard to coated grooves in the second portion, and wherein a data density of the first portion is less than a data density of the second portion.

2. The disc of claim 1, wherein the first portion has a data density of approximately 3.8 Mbits/sqmm, and the second portion has a data density of approximately 4.7 Mbits/sqmm.

3. The disc of claim 1, wherein the phase-change material is an alloy of Sb, In, and Sn.

4. The disc of claim 1, wherein the outer diameter of the disc is approximately 50 mm or less.

5. The disc of claim 4, wherein the outer diameter of the disc is approximately 32 mm or less.

6. The disc of claim 1, wherein the thickness of the disc is approximately 0.6 mm or less.

7. The disc of claim 1, wherein the substrate comprises a polycarbonate material.

* * * * *